(12) United States Patent
Numazaki et al.

(10) Patent No.: US 8,052,119 B2
(45) Date of Patent: Nov. 8, 2011

(54) VALVE DEVICE

(75) Inventors: Kazushi Numazaki, Toyota (JP);
Takuya Suzuki, Anjo (JP); Munetoshi Kuroyanagi, Aichi (JP)

(73) Assignee: JTEKT Corporation, Osaka-shi (JP)

( * ) Notice: Subject to any disclaimer, the term of this patent is extended or adjusted under 35 U.S.C. 154(b) by 367 days.

(21) Appl. No.: 12/470,187

(22) Filed: May 21, 2009

(65) Prior Publication Data

US 2009/0288723 A1 Nov. 26, 2009

(30) Foreign Application Priority Data

May 22, 2008 (JP) ................. 2008-134530

(51) Int. Cl.
*F16D 1/48* (2006.01)
(52) U.S. Cl. ....................... 251/357; 251/282
(58) Field of Classification Search .............. 251/278, 251/281, 282, 357, 900, 901; 137/588, 613, 137/614
See application file for complete search history.

(56) References Cited

U.S. PATENT DOCUMENTS

| | | | | |
|---|---|---|---|---|
| 4,129,284 A | * | 12/1978 | Scapes et al. | 251/205 |
| 4,408,632 A | * | 10/1983 | Kent | 137/516.29 |
| 5,152,504 A | * | 10/1992 | Nixon et al. | 251/332 |
| 6,182,692 B1 | * | 2/2001 | Fischer et al. | 137/557 |
| 6,782,918 B2 | * | 8/2004 | Rousselin | 137/613 |

FOREIGN PATENT DOCUMENTS

JP 2006-144841 6/2006

* cited by examiner

*Primary Examiner* — John Rivell
*Assistant Examiner* — Seth Faulb
(74) *Attorney, Agent, or Firm* — Oblon, Spivak, McClelland, Maier & Neustadt, L.L.P.

(57) ABSTRACT

A valve device includes: a valve housing defining a cylindrical space connected to a high-pressure source, and having a first communication hole open at a valve seat located at a bottom portion of the valve housing and providing fluid communication between the cylindrical space and a low-pressure source; a seal member arranged in the cylindrical space and providing or shutting off fluid communication between the high-pressure and low-pressure sources so that the seal member moves away from or contacts the valve seat; and a stem having an accommodating recess at one end of the stem and moved axially. The seal member is fitted and held in the accommodating recess. The seal member has a second communication hole that provides fluid communication between a bottom face of the accommodating recess and the low-pressure source when the seal member is in contact with the valve seat.

10 Claims, 3 Drawing Sheets

VALVE DEVICE

INCORPORATION BY REFERENCE

The disclosure of Japanese Patent Application No. 2008-134530 filed on May 22, 2008 including the specification, drawings and abstract is incorporated herein by reference in its entirety.

BACKGROUND OF THE INVENTION

1. Field of the Invention

The invention relates to a valve device and, more particularly, to a valve device, such as a manual valve for a gas tank that stores high-pressure gas such as hydrogen gas, that is able to open or shut off a flow passage in which a pressure difference is large.

2. Description of the Related Art

A valve device is provided for a plug element for closing an opening of a gas tank. The valve device has one or more flow passages that provide fluid communication between the inside and outside of the gas tank. The valve device controls flow of gas in the one or more flow passages. An example of the valve device includes a manual valve that is manually opened or closed, which is, for example, described in Japanese Patent Application Publication No. 2006-144841 (JP-A-2006-144841).

The manual valve described in JP-A-2006-144841 is arranged in a first recess (21) that is open to an outer face (16a) of a plug element housing (16) as shown in FIG. 3 of JP-A-2006-144841. The manual valve (14) includes a housing (35), a valve element (36) and an operating screw (37). The housing (35) has a cylindrical shape with a bottom portion (35a) formed at one end. The valve element (36) is accommodated in the housing (35) so that the valve element (36) is slidable in the axial direction. The operating screw (37) is used to operate the valve element (36). The housing (35) is arranged in the first recess (21) so that the bottom portion (35a) contacts a lid element (26) of a check valve (9). Then, the bottom portion (35a) of the housing (35) has a through-hole (38) that is in fluid communication with a through-hole (32) of the check valve (9). A side wall (35b) near the bottom portion (35a) has a through-hole (39) that is in fluid communication with a first flow passage (18). Then, an O ring (36c), which serves as a seal member, is fitted on the outer periphery of the valve element (36). A distal end portion (36a) of the valve element (36) has a conical shape, and contacts or moves away from a valve seat (40).

FIG. 5 and FIG. 6 show a manual valve according to another related art. The manual valve includes a valve housing 91, a seal member 93 and a stem 92. The valve housing 91 defines a cylindrical space 99 having a cylindrical shape with a bottom portion at one end. The seal member 93 is able to contact or move away from a valve seat 991. The valve seat 991 has a flow passage opening 911a (one end of a first communication hole 911), and is provided at the bottom portion of the cylindrical space 99. The stem 92 holds the seal member 93 fitted at one end of the stem 92. The seal member 93 contacts or moves away from the valve seat 991 to thereby close or open the valve. The seal member 93 may be made of a material different from that of the stem 92, or the like. When the seal member 93 is, for example, made of a resin material, the seal member 93 is able to closely contact the valve seat 991, and it is possible to provide a manual valve having a high sealing performance.

Incidentally, when the seal member is provided, close contact property with the valve seat improves and, as a result, the performance of the valve device improves. However, when the valve seat 991 side with respect to the seal member is connected to a low-pressure side and a cylindrical space 99 side with respect to the seal member is connected to a high-pressure side, the seal member 93 may adhere to the low-pressure side valve seat 991 because of its high sealing performance and may interfere with opening and closing of the valve thereafter.

SUMMARY OF THE INVENTION

The invention provides a valve device that is able to prevent a seal member from falling off from a stem when sealing is performed via the seal member fitted in the stem.

An aspect of the invention provides a valve device. The valve device includes: a valve housing that defines a cylindrical space connected to a high-pressure source, and that has a first communication hole that is open at a valve seat located at a bottom portion of the valve housing and that provides fluid communication between the cylindrical space and a low-pressure source; a seal member that is arranged in the cylindrical space and that provides or shuts off fluid communication between the high-pressure source and the low-pressure source in such a manner that the seal member moves away from or contacts the valve seat; and a stem that has an accommodating recess formed at one end of the stem and that moves in an axial direction of the stem, wherein the seal member is fitted and held in the accommodating recess, wherein the seal member has a second communication hole that provides fluid communication between a bottom face of the accommodating recess and the low-pressure source when the seal member is in contact with the valve seat.

With the above aspect of the invention, the seal member has the second communication hole that provides communication between the bottom face of the accommodating recess and the low-pressure source. Thus, it is possible to suppress a force that is generated in a direction in which the seal member moves away from the stem because of a pressure difference between the high-pressure source and the low-pressure source. That is, the second communication hole is formed in the seal member to reduce a force that causes the seal member to fall off from the accommodating recess formed at the distal end portion of the stem and to decrease a pressure in the accommodating recess. Thus, a suction force due to the low-pressure source is also applied to the stem side, so it is possible to reduce the possibility that the seal member falls off from the accommodating recess.

In addition, in the above aspect, the stem may have a third communication hole that provides fluid communication between an inside and an outside of the accommodating recess, and the seal member may closely contact an inner face of the accommodating recess so as to surround the second communication hole to shut off fluid communication between an opening of the third communication hole that is open to the accommodating recess and the second communication hole formed in the seal member.

With the above aspect, the third communication hole is formed to provide fluid communication between the cylindrical space and a gap between the seal member and the accommodating recess. Thus, it is possible to prevent gas from remaining in the gap between the seal member and the accommodating recess. Then, fluid communication between the second communication hole formed in the seal member and the third communication hole formed in the stem is shut off by the seal member to maintain airtightness.

In addition, in the above aspect, in a state where the seal member is in close contact with the bottom portion of the valve housing and the inner face of the accommodating recess, the seal member may have a first portion on which a force from the high-pressure source acts and which is an one end side portion of the seal member that contacts the bottom portion of the valve housing, and a second portion on which a force from the high-pressure source via the third communication hole and which is formed in the other end side portion of the seal member that contacts the accommodating recess of the stem, and the shape of the first portion and the shape of the second portion may be set so that the force that acts on the first portion from the high-pressure source and the force that acts on the second portion from the high-pressure source balance in a direction in which the seal member moves toward or away from the stem or so that a resultant force of the forces acting on the first portion and the second portion acts on the seal member in a direction in which the seal member is pressed into the accommodating recess.

In addition, in the above aspect, a projection area of the first portion, in the direction in which the seal member moves toward or away from the accommodating recess, of the seal member may be larger than or equal to a projection area of the second portion, in the direction in which the seal member moves toward or away from the accommodating recess, of the seal member.

With the above aspect, the shape of the seal member is set so that forces that act on the portions of the seal member from the high-pressure source balance in a direction in which the seal member moves toward or away from the accommodating recess or so that a resultant force presses the seal member into the accommodating recess. Thus, the seal member is prevented from falling out from the stem. Between a valve seat side (side from which the seal member is pressed into the accommodating recess) and a stem side (side from which the seal member is pressed in a direction to move away from the accommodating recess) of the portions that are acted by the forces from the high-pressure source, a projection area of the valve seat side is larger than or equal to a projection area of the stem side. Thus, it is possible to prevent a force from acting in a direction to cause the seal member to move away from the stem. That is, forces received by the seal member in a direction in which the seal member moves toward or away from the stem each are calculated by multiplying a projection area by a pressure applied from the high-pressure source. However, the pressure applied from the high-pressure source is equal between both directions. Therefore, it is possible to determine a direction pressed by the high-pressure source only by comparing the sizes of the projection areas. Note that a projection area of a portion on which the force from the high-pressure source acts, is calculated by excluding a portion at which the seal member is in close contact with the bottom portion of the valve housing or the bottom face of the accommodating recess.

In addition, in the above aspect, in a state where the seal member is in close contact with the bottom portion of the valve housing and the inner face of the accommodating recess, the seal member may have a third portion which faces the bottom portion of the valve housing and on which a force from the low-pressure source acts, and a fourth portion which faces the bottom face of the accommodating recess and on which a force from the low-pressure source acts, wherein the shape of the third portion and the shape of the fourth portion may be set so that the forces that act on the third portion and the fourth portion from the low-pressure source and the forces that act on the first portion and the second portion from the high-pressure source balance in the direction in which the seal member moves toward or away from the stem or so that a resultant force acts on the seal member in the direction in which the seal member is pressed into the accommodating recess, wherein the resultant force is sum of the forces acting on the first portion, the second portion, the third portion, and the fourth portion.

With the above aspect, the shape of the seal member is set so that the forces that act on the first and second portions from the high-pressure source and the forces that act on the third and fourth portions from the low-pressure source balance in the direction in which the seal member moves toward or away from the accommodating recess or so that a resultant force presses the seal member into the accommodating recess. Thus, the seal member is prevented from falling out from the stem.

In addition, in the above aspect, in a state where the seal member is in close contact with the bottom portion of the valve housing and the inner face of the accommodating recess, the seal member may have a portion which faces the bottom portion of the valve housing and on which a force from the low-pressure source acts, and a portion which faces the bottom face of the accommodating recess and on which a force from the low-pressure source acts, wherein the portions of the seal member may be set so that the forces that act on the portions of the seal member from the low-pressure source balance in a direction in which the seal member moves toward or away from the stem or so that a resultant force of the forces acting on the portions acts on the seal member in a direction in which the seal member is pressed into the accommodating recess.

In addition, in the above aspect, a projection area of the portion, in a direction in which the seal member moves toward or away from the accommodating recess, of the seal member, which faces the bottom portion of the valve housing and on which the force from the low-pressure source acts, may be larger than or equal to a projection area of the portion, in a direction in which the seal member moves toward or away from the accommodating recess, of the seal member, which faces the bottom face of the accommodating recess and on which the force from the low-pressure source acts.

With the above aspect, the shape of the seal member is set so that forces which act on the portions of the seal member from the low-pressure source balance in a direction in which the seal member moves toward or away from the accommodating recess or so that a resultant force presses the seal member into the accommodating recess. Thus, the seal member is prevented from falling out from the stem. Between a valve seat side in a direction in which the seal member moves toward or away from the stem (side from which the seal member is pressed in a direction to fall off from the accommodating recess) and a stem side (side from which the seal member is pressed into the accommodating recess) of the portions that are acted by the forces from the low-pressure source, a projection area of the valve seat side is larger than or equal to a projection area of the stem side. Thus, it is possible to prevent a force from acting in a direction to cause the seal member to move away from the stem. That is, as in the case of the portions on which the forces from the high-pressure source acts, the forces received by the seal member in a direction in which the seal member moves toward or away from the stem each are calculated by multiplying a projection area by a pressure applied from the low-pressure source. However, the pressure applied from the low-pressure source is equal between both directions. Therefore, it is possible to determine a direction pressed by the low-pressure source only by comparing the sizes of the projection areas. Note that a projection area of a portion on which the force from the low-pressure source acts, is calculated by excluding a portion at which the seal member is in close contact with the bottom portion of the valve housing or the bottom face of the accommodating recess.

In addition, in the above aspect, the shape of the seal member may be formed symmetrically with respect to an imaginary plane, and wherein the imaginary plane may pass a middle of the seal member in a direction in which the stem moves and may be perpendicular to the direction in which the stem moves.

With the above aspect, the shape of the seal member is symmetrical with respect to an imaginary plane that passes a middle of the seal member in a direction in which the stem moves and is perpendicular to the direction in which the stem moves. Thus, forces that act on the portions, on which the forces from the high-pressure source act, and forces that act on the portions, on which the forces from the low-pressure source acts, balance. Therefore, it is possible to prevent the seal member from falling off from the accommodating recess of the stem.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, an embodiment in which a valve device according to the aspect of the invention is applied to a manual valve (IN manual valve) that opens or closes a filling passage for filling a hydrogen gas tank with hydrogen gas will be described with reference to the accompanying drawings.

Figure 1:
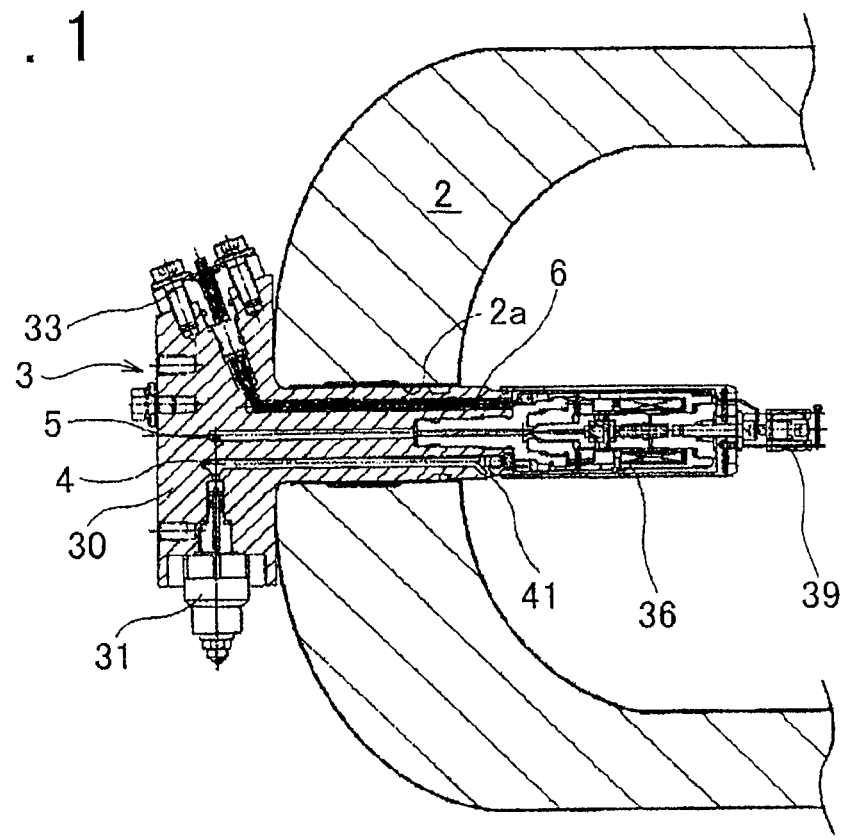
FIG. 1 is a partially schematic sectional view (sectional view taken along the line I-I in FIG. 2) of a hydrogen gas tank according to an embodiment.
Figure 2:
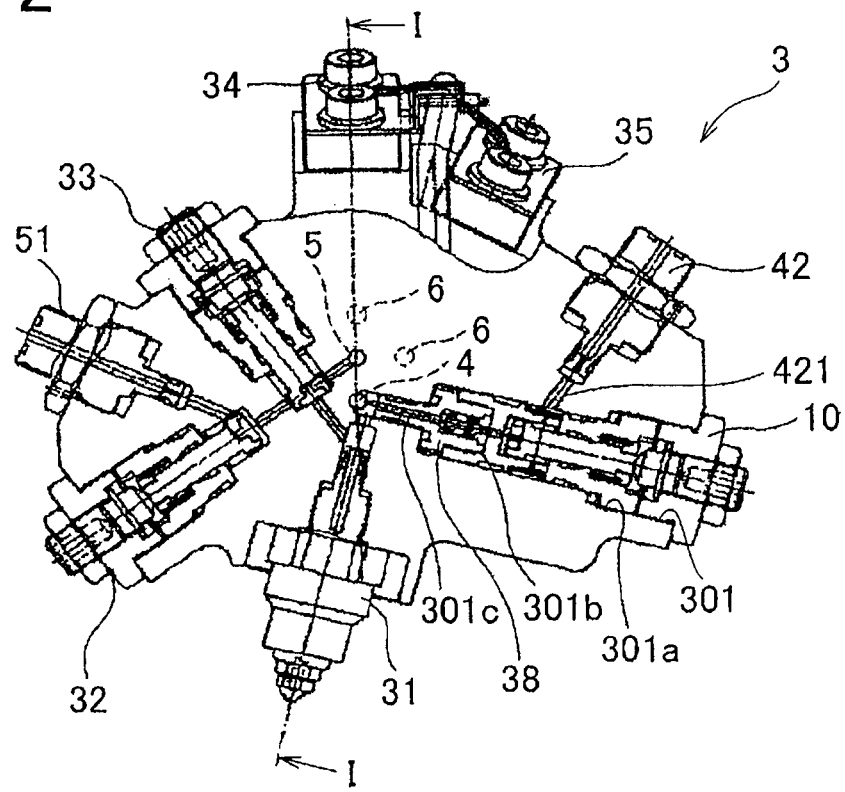
FIG. 2 is a schematic front perspective view of a plug element of the hydrogen gas tank according to the embodiment.

As shown in FIG. 1 and FIG. 2, the hydrogen gas tank, to which the manual valve according to the present embodiment is applied, includes a high-pressure hydrogen tank 2 and a plug element 3. The high-pressure hydrogen tank 2 has an opening 2a that provides fluid communication between the inside and outside of the high-pressure hydrogen tank 2. The plug element 3 includes a plug element body 30 that is inserted in the opening 2a. The plug element body 30 maintains airtightness by an O ring (not shown). The plug element body 30 has a filling passage 4, a supply passage 5 and a wiring passage 6. The filling passage 4 is used to supply hydrogen into the high-pressure hydrogen tank 2. The supply passage 5 is used to supply hydrogen from the inside of the high-pressure hydrogen tank 2 to the outside thereof. The wiring passage 6 is used to electrically connect the inside and outside of the high-pressure hydrogen tank 2.

An IN port 42, an IN manual valve 10 and a check valve 38 are arranged in the filling passage 4. The IN port 42 is connected to an external hydrogen gas supply source (not shown) along the flow of hydrogen gas from the outside of the high-pressure hydrogen tank 2 to the inside thereof. The valve device according to the aspect of the invention may be suitably applied to the IN manual valve 10. The filling passage 4 has an opening 41 that is ultimately open to the inside of the high-pressure hydrogen tank 2.

A solenoid valve 36, an OUT manual valve 32 and an OUT port 51 are arranged in a supply passage 5 along the flow of hydrogen from the inside of the high-pressure hydrogen tank 2 to the outside thereof. The OUT port 51 is connected to an external hydrogen gas supply target (not shown). A welding valve 32 and a depressurizing manual valve 33 are connected in parallel between the outside and the filling passage 4 between the check valve 38 and the opening 41.

The wiring passage 6 accommodates electrical wires for transmitting a temperature signal generated by a temperature sensor 39 and a control signal by which the solenoid valve 36 is controlled. The temperature sensor 39 is provided at the distal end of the plug element body 30. The wiring passage 6 maintains airtightness between the inside and outside of the high-pressure hydrogen tank 2 in a state where those wires are passed therethrough.

As shown in FIG. 2, the IN manual valve 10 is arranged in an opening 301 formed in the plug element body 30. The opening 301 is formed of first to third cylindrical spaces 301a, 301b and 301c having three-step inside diameters starting from a portion open to the outside. The inner peripheral face of the first cylindrical space 301a that is closest to the outside has a thread groove. The distal end portion of the third cylindrical space 301c that is farthest from the outside is connected to the filling passage 4 (low-pressure source). The side face of the second cylindrical space 301b between the cylindrical spaces 301a and 301c has an opening 421 to which the IN port 42 (high-pressure source) is connected.

Figure 3:
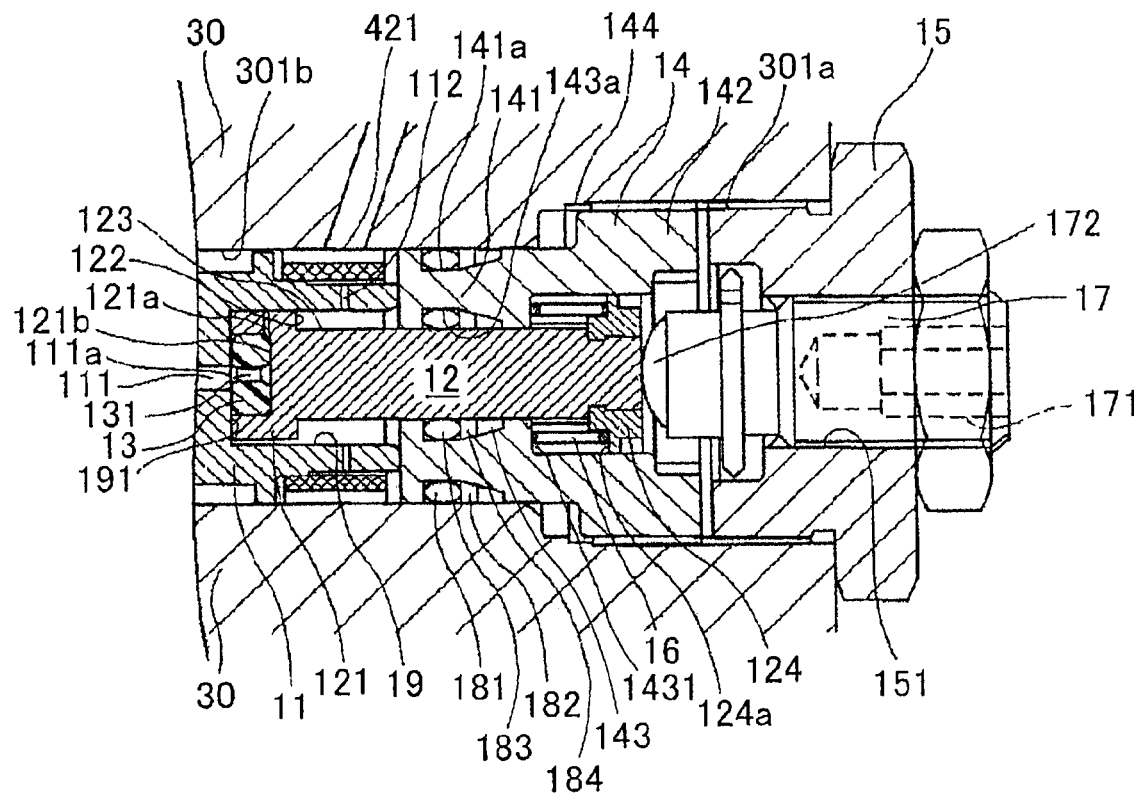
FIG. 3 is a sectional view of an IN manual valve according to the embodiment.
Figure 4:
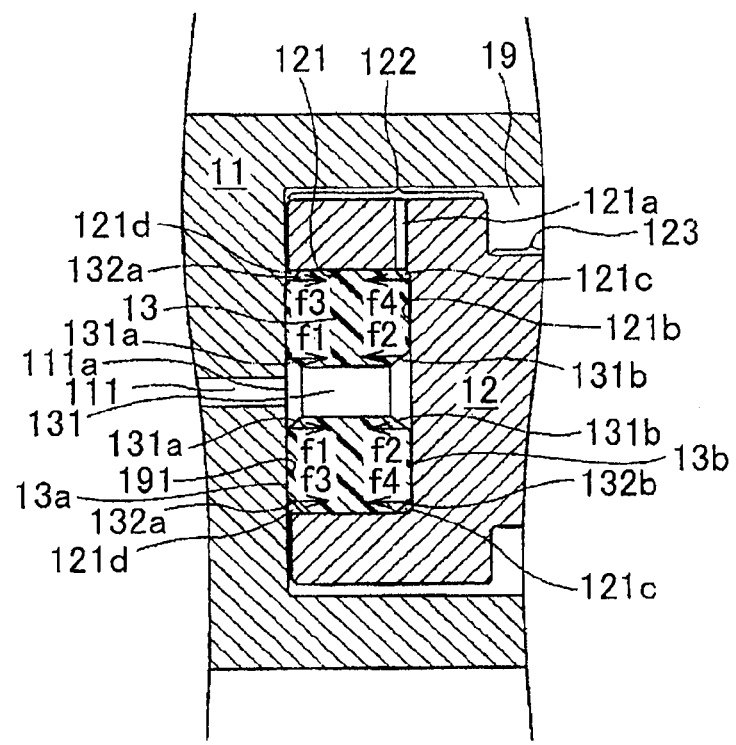
FIG. 4 is a partially magnified sectional view of a seal member and its surroundings of the IN manual valve according to the embodiment.

As shown in FIG. 3, the IN manual valve 10 includes a valve housing 11, a stem 12, a seal member 13, a first plug 14, a first seal ring 181, a first back-up ring 182, a second seal ring 183, a second back-up ring 184, a spring 16, an operating screw 17 and a second plug 15. The stem 12 is movable inside the valve housing 11 in the axial direction. The seal member 13 is fitted to the distal end portion of the stem 12. The first plug 14, the first seal ring 181, the first back-up ring 182, the second seal ring 183 and the second back-up ring 184 hold the stem 12 in a cylindrical space and ensure airtightness between the stem 12 and the cylindrical space. The spring 16 urges the stem 12 in a direction opposite to a side at which the seal member 13 is fitted. The operating screw 17 and the second plug 15 are manually operated to press the stem 12 toward the side at which the seal member 13 is fitted.

The valve housing 11 is open at one end side and has a bottom portion 191 at the other end. In addition, the inside of the valve housing 11 is a cylindrical space 19 defined by the valve housing 11. The bottom portion 191 (valve seat) of the valve housing 11 has a first communication hole 111 that has a flow passage opening 11a that is open to the one end side of the valve housing 11. In addition, the side portion of the valve housing 11 has a communication hole 112 that is in fluid communication with an opening 421. The opening 421 provides fluid communication between the cylindrical space 19 and the second cylindrical space 301b, and is open to the second cylindrical space 301b. A peripheral portion of the flow passage opening 111a in the bottom portion 191 serves as the valve seat of the IN manual valve 10. The valve housing 11 is arranged inside the second cylindrical space 301b so that the one end side of the valve housing 11 is directed toward the outside of the IN manual valve 10. The check valve 38 is arranged in the second cylindrical space 301b adjacent to the third cylindrical space 301c with respect to the valve housing 11. The flow passage opening 111a is connected to the filling passage 4 via the check valve 38. Although not described in detail, the valve housing 11 is integrated with one of housings of the check valve 38.

The stem 12 has a thick portion 122 that is formed by increasing the diameter of one distal end of the stem 12. The thick portion 122 is inserted from the one end side of the valve housing 11 into the cylindrical space 19. The outside diameter of the thick portion 122 is slightly smaller than the inside diameter of the cylindrical space 19, and hydrogen gas is allowed to pass through the gap therebetween. The length of the thick portion 122 of the stem 12 in the axial direction is shorter than the length of the cylindrical space 19. The outside diameter of an axially middle portion 123 of the stem 12 is constant, and the stem 12 is slidable in the axial direction inside the first plug 14, which will be described later. A slide of the stem 12 in the axial direction is allowed from a state where the distal end of the thick portion 122 contacts the bottom portion 191 of the cylindrical space 19 to a state where the thick portion 122 reaches the first plug 14 and cannot move any more. A flange portion 124 is fitted to the other end portion of the stem 12. The spring 16 is in contact with the flange portion 124. The spring 16 applies an urging force in a direction from the one end portion side of the stem 12 toward the other end portion side. A cylindrical accommodating recess 121 is formed at the distal end of the one end portion of the stem 12. The accommodating recess 121 is a space to which the seal member 13 can be fitted. As shown in FIG. 3, a third communication hole 121a is formed from a side portion of the stem 12 defining an inner face of the accommodating recess 121 near a bottom face 121b toward a radially outer side (direction perpendicular to the axial direction) of the stem 12. The third communication hole 121a eliminates a possibility that gas excessively accumulates between the seal member 13 and the accommodating recess 121 of the stem 12 and, as a result, the seal member 13 floats from the inner face of the accommodating recess 121.

The seal member 13 is made of a material (resin, or the like) that is more easily deformed than the stem 12 or the inner face of the cylindrical space 19 of the valve housing 11. The seal member 13 is a doughnut-shaped member in which a second communication hole 131 is formed at the center. The outside diameter of the seal member 13 is equivalent to the inside diameter of the accommodating recess 121 of the stem 12, and has a size such that the seal member 13 may be fixedly fitted to the 6 accommodating recess 121. One end face 13a of the seal member 13 is contactable with the bottom portion 191 of the valve housing 11, and the other end face 13b of the seal member 13 is in contact with the bottom face 121b of the accommodating recess 121. The size of the second communication hole 131 formed in the seal member 13 is equivalent to the size of the flow passage opening 111a when the seal member 13 contacts the flow passage opening 111a. The one end face 13a, which is located on the peripheral side of the flow passage opening 111a, is able to surround the periphery of the flow passage opening 111a, and is able to seal a gap between the flow passage opening 111a and the cylindrical space 19. A gap between the bottom portion 191 of the valve housing 11 and the one end face 13a is sealed so that the stem 12 is pressed in the axial direction (direction toward the one end side of the stem 12) to bring the bottom portion 191 and the one end face 13a in to close contact with each other. A gap between the bottom face 121b of the accommodating recess 121 and the other end face 13b is sealed so that the bottom face 121b and the other end face 13b are constantly in close contact with each other. The length of the seal member 13 in the axial direction is slightly longer than the depth of the accommodating recess 121. In a state where the seal member 13 is fitted in the accommodating recess 121 and the other end face 13b is in contact with the bottom face 121b of the accommodating recess 121, the one end face 13a slightly protrudes from the accommodating recess 121. Both ends of an inner portion of the seal member 13, facing the second communication hole 131, have tapered portions 131a and 131b. The tapered portions 131a and 131b are tapered and have the same shape. Between the tapered portions 131a and 131b of the seal member 13, the taper portion located at the one end face 13a side is the tapered portion 131a, which serves as a third portion, and the tapered portion located at the other end face 13b side of the seal member 13 is the tapered portion 131b, which serves as a fourth portion. Tapered portions 132a and 132b are formed at both ends of a radially outer portion of the seal member 13. The tapered portions 132a and 132b are chamfered to have the same shape. Between the tapered portions 132a and 132b of the seal member 13, the tapered portion located at the one end face 13a side is the tapered portion 132a, which serves as a first portion, and the tapered portion located at the other end face 13b side of the seal member 13 is the tapered portion 132b, which serves as a second portion.

The first plug 14 contacts one end of the valve housing 11. The first plug 14 has a first plug distal end portion 141 and a first plug proximal portion 142. The first plug distal end portion 141 has an outer shape of which the size is substantially equal to the inside diameter of the second cylindrical space 301b. The first plug proximal portion 142 has an outer shape of which the size is substantially equal to the inside diameter of the first cylindrical space 301a. The first plug proximal portion 142 has a thread groove on its outer peripheral face, and the thread groove can be screwed onto the thread groove formed on the inner face of the first cylindrical space 301a. The first plug 14 is fixed so that the first plug proximal portion 142 is screwed into the first cylindrical space 301a, The first plug 14 has a length such that a space is present inside the first cylindrical space 301a in the axial direction after being screwed into the first to third cylindrical spaces 301a to 301c and the second plug 15, which will be described later, can be inserted into the space. The first plug distal end portion 141 has an outer peripheral tapered face 141a on the outer face side in the axially middle portion. The outer peripheral tapered face 141a gradually reduces its diameter toward the valve housing 11. Both ends of the outer peripheral tapered face 141a in the axial direction are substantially equal to the inside diameter of the inner peripheral face that forms the second cylindrical space 301b. Cylindrical inner spaces 143 and 144 are formed in the first plug 14. The cylindrical inner spaces 143 and 144 extend through the first plug 14 in the axial direction. The inner spaces 143 and 144 are serially formed from the valve housing 11 side in the stated order. The inside diameter of the inner peripheral face that forms the inner space 143 is substantially equal to the outside diameter of the middle portion 123 of the stem 12. An inner peripheral tapered face 143a is formed at the axially middle portion of the inner peripheral face that forms the inner space 143. The inner peripheral tapered face 143a gradually increases its diameter toward the valve housing 11. The inside diameters of both ends of the inner peripheral tapered face 143a in the axial direction are substantially equal to the outside diameter of the middle portion 123 of the stem 12. The inside diameter of the inner peripheral face that forms the inner space 144 is larger than the outside diameter of the middle portion 123 of the stem 12, and is substantially equal to the outside diameter of the flange portion 124.

The seal ring 181 is arranged on the outer peripheral tapered face 141a at a side adjacent to the valve housing 11, and seals a gap between the first plug 14 and the inner peripheral face that forms the second cylindrical space 301b. The outer peripheral tapered face 141a is formed on the outer periphery of the first plug distal end portion 141 of the first plug 14. Because the valve housing 11 side with respect to the seal ring 181 undergoes a higher pressure, the seal ring 181 tends to move on the outer peripheral tapered face 141a toward the first plug proximal portion 142. However, the outer peripheral tapered face 141a increases its diameter as it approaches the first plug proximal portion 142, so the seal ring 181 is brought into a further close contact state to thereby ensure sealing performance. The back-up ring 182 is made of a material that is more resistant to deformation than the seal ring 181. The back-up ring 182 is provided on a side of the seal ring 181, which is opposite to a side on which the valve housing 11 is provided. The back-up ring 182 prevents the seal ring 181 from being excessively caught in a gap between the outer peripheral tapered face 141a and the inner face of the plug element body 30 forming the second cylindrical space 301b to be damaged.

The seal ring 183 is arranged on the inner peripheral tapered face 143a at a side adjacent to the valve housing 11, and seals a gap between the inner peripheral face of the first plug 14 and the outer peripheral face of the middle portion 123 of the stem 12. The inner peripheral tapered face 143a is formed on the inner periphery of the first plug distal end portion 141 of the first plug 14. Because the valve housing 11 side with respect to the seal ring 183 undergoes a higher pressure, the seal ring 183 tends to move on the inner peripheral tapered face 143a toward the first plug proximal portion 142. However, the inner peripheral tapered face 143a reduces its diameter as it approaches the first plug proximal portion 142, so the seal ring 183 is brought into a further close contact state to thereby ensure sealing performance. The back-up ring 184 is made of a material that is more resistant to deformation than the seal ring 183. The back-up ring 184 is provided on a side of the seal ring 183, which is opposite to a side on which the valve housing 11 is provided. The back-up ring 184 prevents the seal ring 183 from being excessively caught in a gap between the inner peripheral tapered face 143a and the outer face of the middle portion 123 of the stem 12 to be damaged.

The inside diameter of the spring 16 is larger than the outside diameter of the middle portion 123 of the stem 12. The outside diameter of the spring 16 is smaller than the inside diameter of the inner peripheral face that forms the inner space 144 of the first plug 14 and is also smaller than the outside diameter of the flange portion 124. The spring 16 is arranged between the middle portion 123 and the inner peripheral face of the first plug 14 that forms the inner space 144. One end of the spring 16 is in contact with a stepped portion 1431 between the inner space 144 and the inner space 143, and the other end of the spring 16 is in contact with a side face 124a of the flange portion 124 facing the middle portion 123 side. The spring 16 constantly urges the flange portion 124 in a direction from the valve housing 11 side toward the second plug 15. Thus, the spring 16 urges the seal member 13 in a direction in which the seal member 13 moves away from the flow passage opening 111a.

The second plug 15 is a cylindrical member. The second plug 15 has a thread groove on its outer face. The thread groove can be screwed onto the thread groove formed on the inner face of the plug element body 30 that forms the first cylindrical space 301a. The second plug 15 has an inner peripheral face that forms an inner space 151 inside. The operating screw 17 can be screwed onto the inner space 151.

The operating screw 17 is screwed onto the inner peripheral face that forms the inner space 151 of the second plug 15. Rotating a wrench with the wrench inserted into a hexagon socket 171 of the operating screw 17 changes a degree to which the operating screw 17 is screwed in, and a position of a distal end portion 172 of the operating screw 17 moves in the axial direction. The distal end portion 172 presses the flange portion 124 of the stem 12 to move the stem 12. Thus, it is possible to hold the stem 12 at a selected position.

With the thus configured IN manual valve 10 according to the present embodiment, the following advantageous effects are obtained.

First, a case in which the IN manual valve 10 is closed will be described. A wrench is inserted into the hexagon socket 171, and the operating screw 17 is rotated. Thus, the operating screw 17 is moved toward the stem 12. Then, the distal end portion 172 of the operating screw 17 presses the flange portion 124 of the stem 12 to move the stem 12 toward the valve housing 11. As the stem 12 is moved, the one end face 13a of the seal member 13 fitted in the accommodating recess 121 of the stem 12 contacts the peripheral portion of the flow passage opening 111a. At this time, the one end face 13a of the seal member 13 closely contacts the bottom portion 191 of the valve housing 11, and the other end face 13b of the seal member 13 closely contacts the bottom face 121b of the accommodating recess 121. This ensures a seal between the first communication hole 111 and the cylindrical space 19. In this case, the tapered portions 131a and 131b (third portion and fourth portion) that are applied the pressure from the low-pressure source in the above sealed state undergo the same pressure from the low-pressure source, so the directions in which external forces f1 and f2 act in the axial direction are opposite. In addition, the projection areas of the tapered portions 131a and 131b when viewed in the axial direction of the stem 12 have the same size, so the external forces f1 and f2 balance with each other. Similarly, for the tapered portions 132a and 132b (first portion and second portion) that are applied the pressure from the high-pressure source in the above sealed state as well, the same pressure is introduced from the high-pressure source into spaces 121c and 121d that are in fluid communication with the cylindrical space 19. Thus, the tapered portions 132a and 132b undergo the same pressure, so the directions in which external forces f3 and f4 act on the tapered portions 132a and 132b in the axial direction of the stem 12 are opposite. In addition, the projection areas of the tapered portions 132a and 132b when viewed in the axial direction of the stem 12 have the same size, so the external forces f3 and f4 balance with each other. That is, not only the external forces that act on the portions of the seal member 13 at the side that is applied the pressure from the high-pressure source balance with each other but also the external forces that act on the portions of the seal member 13 at the side that is applied the pressure from the low-pressure source balance with each other. Thus, an urging force due to the pressure of gas does not act on the seal member 13 in any of the directions. That is, the seal member 13 is hardly moved by gas pressure in a direction in which the seal member 13 falls off from the accommodating recess 121 and, also, in a direction in which the seal member 13 is pressed into the accommodating recess 121.

A case in which the IN manual valve 10 is opened from the above state will be described. As a wrench is inserted into the hexagon socket 171 and is rotated, the operating screw 17 moves in a direction opposite to the stem 12 side. An urging force is applied to the side face 124a of the flange portion 124 of the stem 12 by the spring 16. Therefore, as the operating screw 17 moves away from the stem 12, the stem 12 also moves in the axial direction in accordance with the displacement of the operating screw 17. At this time, the seal member 13 fitted in the accommodating recess 121 at the distal end of the stem 12 also moves together. As a result, the one end face 13a of the seal member 13 moves away from the bottom portion 191 of the valve housing 11, and the flow passage opening 111a of the first communication hole 111 is directly in fluid communication with the cylindrical space 19. Thus, hydrogen gas flows in accordance with a pressure difference therebetween. In this case, as described above, no external force due to gas acts on the seal member 13, so, as the stem 12 moves, the seal member 13 is also allowed to move without any interference. In addition, even when the seal member 13 moves in a direction to move away from the accommodating recess 121 because of an unexpected factor, the seal member 13 is able to function until the seal member 13 completely falls off from the accommodating recess 121. That is, when the seal member 13 closely contacts the bottom portion 191 and slightly moves in a direction to move away from the accommodating recess 121 to enter a state where the seal member 13 is semifitted to the accommodating recess 121, the other end face 13b of the seal member 13 moves away from the bottom face 121b of the accommodating recess 121. Thus, the flow passage opening 111a can be in fluid communication with the IN port 42 via the second communication hole 131, the accommodating recess 121 and the third communication hole 121a, thereby functioning as a valve. On the other hand, in the semifitted state where the seal member 13 is slightly moved away from the accommodating recess 121, when the stem 12 is moved toward the one end side, the seal member 13 contacts the bottom portion 191 of the valve housing 11 and is pressed into the accommodating recess 121, thus receiving the seal member 13 into the accommodating recess 121. Ultimately, the other end face 13b of the seal member 13 contacts and is brought into close contact with the bottom face 121b of the accommodating recess 121. Then, fluid communication between the second communication hole 131 and the third communication hole 121a is shut off to make it possible to ensure a seal between the flow passage opening 111a and the cylindrical space 19.

Figure 5:
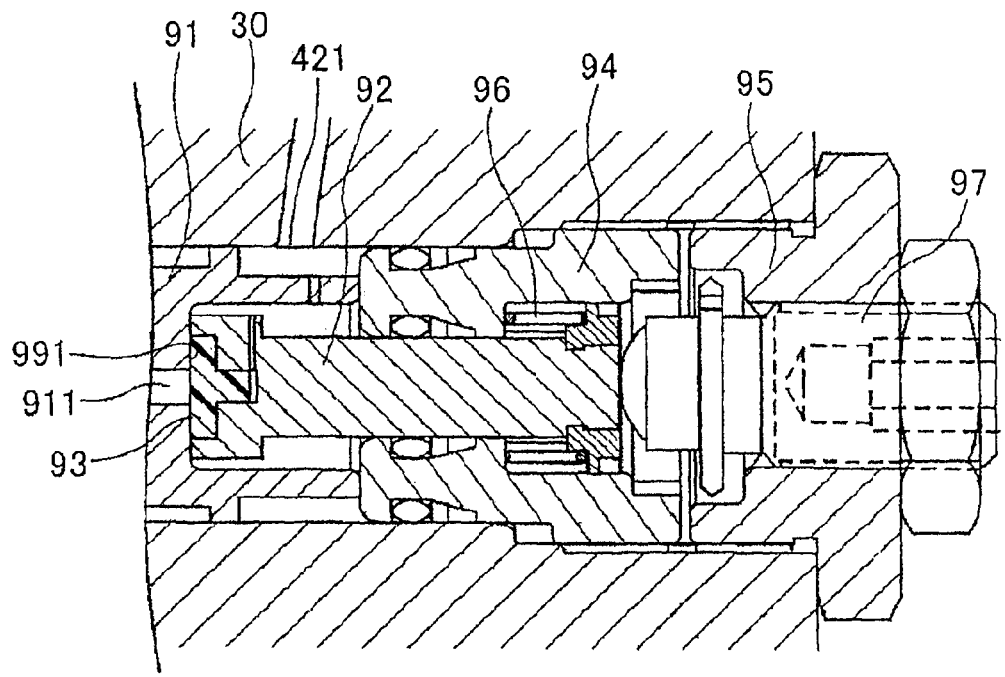
FIG. 5 is a sectional view of an IN manual valve according to a related art.

Here, in the manual valve according to the related art as described with reference to FIG. 5, when the same operation is performed as in the case of the manual valve 10 according to the present embodiment, inconvenience may occur because of a mechanism as described below.

Figure 6:
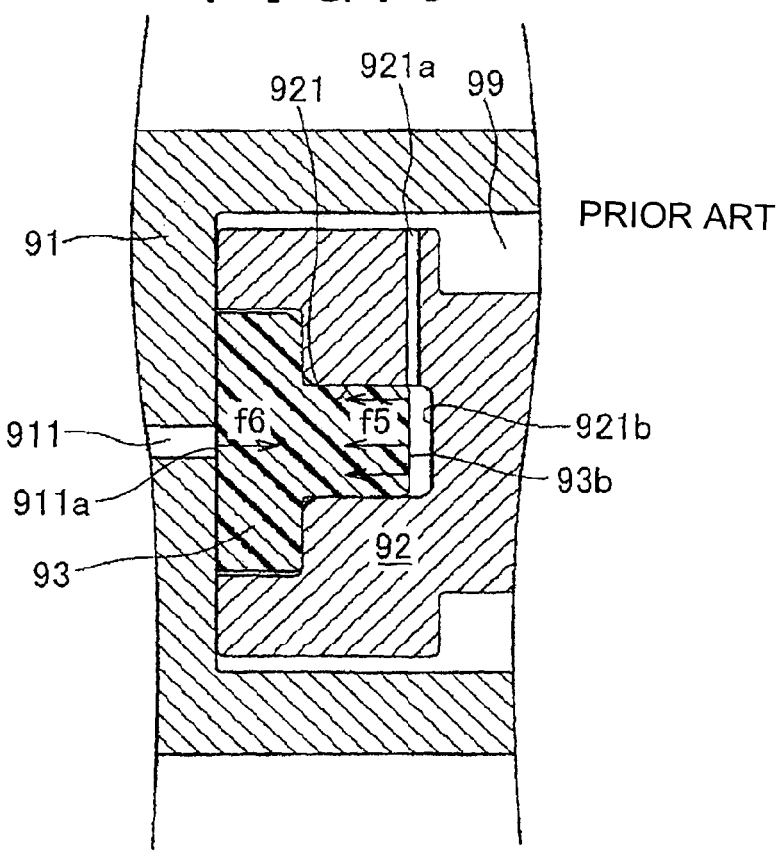
FIG. 6 is a partially magnified sectional view of a seal member and its surroundings of the IN manual valve according to the related art.

The description will be made with reference to the magnified figure of the distal end portion of the stem 92 shown in FIG. 6. An accommodating recess 921 is formed at the distal end of the stem 92. The seal member 93 can be fitted into the accommodating recess 921. A third communication hole 921a is formed at a side face of the accommodating recess 921 near a bottom face 921b. The third communication hole 921a provides fluid communication between the accommodating recess 921 and the cylindrical space 99. The seal member 93 has a shape such that two large and small cylinders are coaxially disposed one above the other. The seal member 93 is fitted in the accommodating recess 921 so that a small-diameter portion of the seal member 93 is placed in a deep side of the accommodating recess 921. As the thus configured manual valve according to the related art is closed, a force due to a pressure in the cylindrical space 99 that is in fluid communication with the high-pressure source acts on the seal member 93 as a force f5. A force f6 due to a pressure in the first communication hole 911 that is in fluid communication with the low-pressure source is much smaller than the force f8 because the area of a portion on which the force f6 acts is small and the pressure of gas is also small. Thus, considering the seal member 93 as a whole, an external force acts in a direction to cause the seal member 93 to fall off from the accommodating recess 921. Here, when a pressure difference between the low-pressure source and the high-pressure source is large, for example, when the high-pressure hydrogen tank 2 is empty, a difference between the force f5 and the force f6 increases. This increase in difference may overcome the frictional force between the outer peripheral face of the seal member 13 and the inner face of the accommodating recess 921, and may move the seal member 93 in a direction to actually fall off from the accommodating recess 921. As a result, the seal member 93 continues to close the first communication hole 911, and it becomes difficult to open the valve.

In contrast, in the valve device according to the present embodiment, the external forces f1 and f2 that act on the tapered portions 131a and 131b of the seal member 13 from the low-pressure source are opposite in directions and are equal in magnitude. Furthermore, the external forces f3 and f4 that act on the tapered portions 132a and 132b of the seal member 13 from the high-pressure source are also opposite in directions and are equal in magnitude. Thus, it is possible to prevent the seal member 13 from moving away from the accommodating recess 121 formed in the stem 12.

The aspect of the invention is not limited to the embodiment described above, but it may be appropriately modified into various forms without departing from the scope of the invention.

What is claimed is:

1. A valve device comprising:
a valve housing that defines a cylindrical space connected to a high-pressure source, and that has a first communication hole that is open at a valve seat located at a bottom portion of the valve housing and that provides fluid communication between the cylindrical space and a low-pressure source;
a seal member that is arranged in the cylindrical space and that provides or shuts off fluid communication between the high-pressure source and the low-pressure source such that the seal member moves away from or contacts the valve seat; and
a stem that has an accommodating recess formed at one end of the stem and that moves in an axial direction of the stem,
wherein the seal member is fitted and held in the accommodating recess, and
wherein the seal member has a second communication hole that provides fluid communication between a bottom face of the accommodating recess and the low-pressure source when the seal member is in contact with the valve seat.

2. The valve device according to claim 1, wherein
the stem has a third communication hole that provides fluid communication between an inside and an outside of the accommodating recess, and
the seal member closely contacts an inner face of the accommodating recess so as to surround the second communication hole to shut off fluid communication between an opening of the third communication hole that is open to the accommodating recess and the second communication hole formed in the seal member.

3. The valve device according to claim 2, wherein the third communication hole is formed in a side portion of the stem defining the inner face of the accommodating recess, and wherein the opening of the third communication hole which opens to the accommodating recess is located at a position adjacent to the bottom face of the accommodating recess.

4. The valve device according to claim 3, wherein in a state where the seal member is moved in a direction away from the accommodating recess and is fitted in the accommodating recess, the seal member moves away from the bottom face of the accommodating recess to provide fluid communication between the second communication hole and the third communication hole, and wherein, when the stem moves in the axial direction so that the seal member is pressed against the bottom portion of the valve housing, the seal member is brought into close contact with the bottom face of the accommodating recess to shut off fluid communication between the second communication hole and the third communication hole.

5. The valve device according to claim 2, wherein, in a state where the seal member is in close contact with the bottom portion of the valve housing and the inner face of the accommodating recess, a first force from the high-pressure source acts on a first portion of the seal member, the first portion being disposed on a first end side portion of the seal member that contacts the bottom portion of the valve housing, and a a second force from the high-pressure source via the third communication hole acts on a second portion of the seal member, the second portion being disposed on a second end side portion of the seal member that contacts the bottom face of the accommodating recess of the stem, and wherein a shape of the first portion and a shape of the second portion are set so that the first force that acts on the first portion from the high-pressure source and the second force that acts on the second portion from the high-pressure source balance in a direction in which the seal member moves toward or away from the stem or so that a resultant force of the first and second forces acting on the first portion and the second portion, respectively, acts on the seal member in a direction in which the seal member is pressed into the accommodating recess.

6. The valve device according to claim 5, wherein a projection area of the first portion, in view of the direction in which the seal member moves toward or away from the stem, of the seal member is larger than or equal to a projection area of the second portion, in view of the direction in which the seal member moves toward or away from the accommodating recess, of the seal member.

7. The valve device according to claim 5, wherein in a state where the seal member is in close contact with the bottom portion of the valve housing and the inner face of the accommodating recess, a third force from the low-pressure source acts on a third portion of the seal member, the third portion facing the bottom portion of the valve housing, and a fourth force from the low-pressure source acts on a fourth portion facing the bottom face of the accommodating recess, wherein a shape of the third portion and a shape of the fourth portion are set so that the third and fourth forces that act on the third portion and the fourth portion from the low-pressure source, respectively, and the first and second forces that act on the first portion and the second portion from the high-pressure source, respectively, balance in the direction in which the seal member moves toward or away from the stem or so that a resultant force acts on the seal member in the direction in which the seal member is pressed into the accommodating recess, and wherein the resultant force is a sum of the first, second, third, and fourth forces acting on the first portion, the second portion, the third portion, and the fourth portion, respectively.

8. The valve device according to claim 1, wherein, in a state where the seal member is in close contact with the bottom portion of the valve housing and the inner face of the accommodating recess, the seal member has a portion which faces the bottom portion of the valve housing and on which a force from the low-pressure source acts, and a portion which faces the bottom face of the accommodating recess and on which a force from the low-pressure source acts, and wherein the portions of the seal member are set so that the forces that act on the portions of the seal member from the low-pressure source and the high-pressure source balance in a direction in which the seal member moves toward or away from the stem or so that a resultant force of the forces acting on the portions acts on the seal member in a direction in which the seal member is pressed into the accommodating recess.

9. The valve device according to claim 8, wherein a projection area of the portion, in view of the direction in which the seal member moves toward or away from the stem, of the seal member, which faces the bottom portion of the valve housing and on which the force from the low-pressure source acts, is larger than or equal to a projection area of the portion, in view of the direction in which the seal member moves toward or away from the stem, of the seal member, which faces the bottom face of the accommodating recess and on which the force from the low-pressure source acts.

10. The valve device according to claim 1, wherein a shape of the seal member is symmetrical with respect to an imaginary plane, the imaginary plane passing through a middle of the seal member in a direction in which the stem moves and being perpendicular to the direction in which the stem moves.

* * * * *